Feb. 14, 1967  S. V. PUIDOKAS  3,303,721
AXLE HOUSING ASSEMBLY
Filed Oct. 12, 1964  2 Sheets-Sheet 1
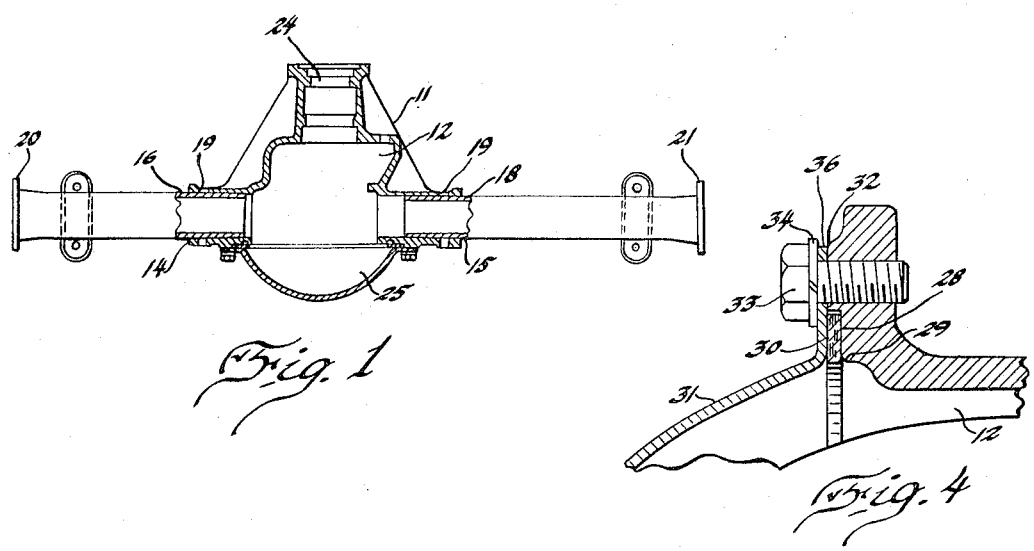
Fig. 1
Fig. 4
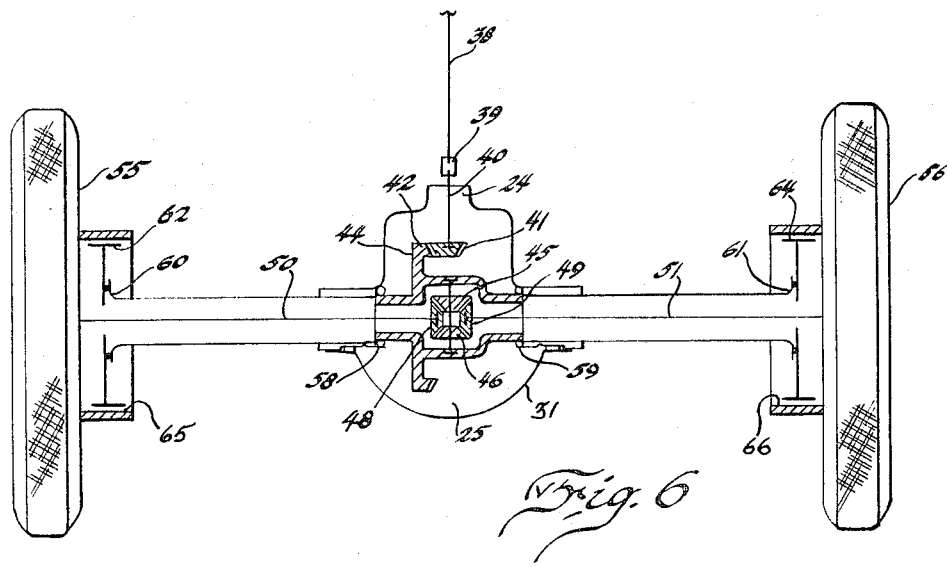
Fig. 6
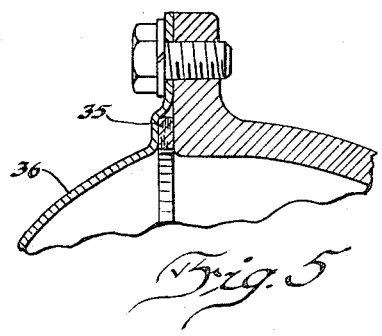
Fig. 5
INVENTOR.
STANLEY V. PUIDOKAS
BY
Carl J. Barbee
ATTORNEY United States Patent Office 3,303,721
Patented Feb. 14, 1967

3,303,721
AXLE HOUSING ASSEMBLY
Stanley V. Puidokas, Kenosha, Wis., assignor to American Motors Corporation, Kenosha, Wis., a corporation of Maryland
Filed Oct. 12, 1964, Ser. No. 403,046
2 Claims. (Cl. 74—607)

This invention relates generally to an axle housing assembly for a vehicle and more particularly to an improvement in closing and sealing the opening in the housing assembly through which the differential gear unit is installed.

The conventional axle housing assembly for a vehicle consists of a differential gear unit housing having entrances therein in which are secured as by welding or the like, the left and right axle tubes. A large opening in the differential or banjo portion of the axle housing assembly is required for the installation of a drive pinion and the associated differential gear unit which drives the axles. A suitable aperture is also provided in the banjo portion for the extension therethrough of a pinion shaft which is usually connected to a source of power by a universal joint. Commonly, the aforementioned opening is closed by placing on the peripheral flange mounting surface surrounding the opening, a full faced flange gasket and attaching to the flange as by capscrews, a cover made of light weight material. A suitable drain plug is usually incorporated in the cover for the servicing of the differential gear unit.

The trend in recent years has been to reduce the vehicle weight while increasing the power of the engines for use therewith. This lightening of the vehicle structure has also extended to the axle housing assembly. When it is recalled, for example, that a substantial amount of the force required to stop the speeding vehicle must be supplied by brake shoes anchored to the rear brake support plates and that each plate is attached to an end of one of the axle tubes, it is readily apparent that the axle housing assembly is subjected to a severe twisting action. Of course, during vehicle operation, the driving pinion, differential and axles also exert loads on the axle housing assembly.

The light weight cover in combination with the gasket between the cover and the aforementioned flange has not substantially contributed to strengthening the axle housing assembly at its weak point, namely, the large opening required for the installation of the differential gear unit. As a consequence, the peripheral flange mounting surface has flexed especially during vehicle braking action. This flexing has, in extreme cases, caused permanent deformation of the surface. As a result of the flexing, grease from the interior of the assembly has, therefore, leaked past the gasket. This grease falls to the surface beneath the vehicle creating an objectionable situation.

Applicant has solved the leakage problem, which is basically the result of a lack of structural rigidity, by attaching as by capscrews or the like, a cover of strong material to the flange mounting surface surrounding the opening thereby achieving metal-to-metal contact with the differential portion of housing assembly. This, in effect, closes the opening and creates a boxlike figure at this structural weak point. The cover, by completing the box, contributes in particular to resisting the twisting effect caused by the braking of the vehicle. The lack of a gasket between the mounting surface and cover reduces the slippage between these surfaces when the housing assembly is twisted.

Obviously, a seal is still needed to prevent leakage of grease from the housing assembly. Applicant has provided for this in an extremely economical manner by creating a peripheral recessed gasket seat in the differential portion of the housing assembly radially inward of the mounting surface and preferably immediately surrounding the opening. The peripheral seat and mounting surface are also preferably circular in nature to simplify the machining and deburring processes. It is to be understood, however, that the seat could also be incorporated in the cover. The seat is located in the housing primarily because the seat machining operation can be easily accomplished in conjunction with the other housing assembly machining operations.

An economical precompression lathe cut gasket of generally rectangular cross section is utilized with the above-noted seat. The cover, which is attached by capscrews to the flange, compresses this gasket while at the same time providing metal-to-metal contact at the mounting surface. It is note-worthy also that the gasket need not have holes therein for the capscrews which reduces sealing area. The precompressed gasket, by virtue of its greater thickness also provides improved sealing because it can easily compensate for any bowing of the cover between the hold down capscrews.

Applicant's axle housing assembly with the metal-to-metal contact between the cover and the mounting surface for the differential gear unit opening provides increased rigidity and a lighter structure. Further the increased rigidity of the axle housing assembly in combination with the associated precompression gasket virtually eliminates the leakage of grease outward through the opening for the differential gear unit.

It is, therefore, an object of this invention to provide a new and improved axle housing assembly.

Another object of this invention is to provide an axle housing assembly of greater overall structural rigidity.

Another object of this invention is to provide an axle housing assembly that is more effectively and economically closed and sealed at the opening therein for the installation of the differential gear unit.

Other objects will become apparent from the following description in conjunction with the attached drawings in which:

FIGURE 1 is a partial top section of the axle housing assembly of this invention.

FIGURE 4 is an enlarged fragmentary section along line 4—4 of FIGURE 2.

FIGURE 5 is an enlarged fragmentary section similar to FIGURE 4 of another embodiment of the axle housing assembly of this invention.

FIGURE 6 is a schematic plan view of a drive axle assembly incorporating the axle housing assembly of this invention.

Figure 2:
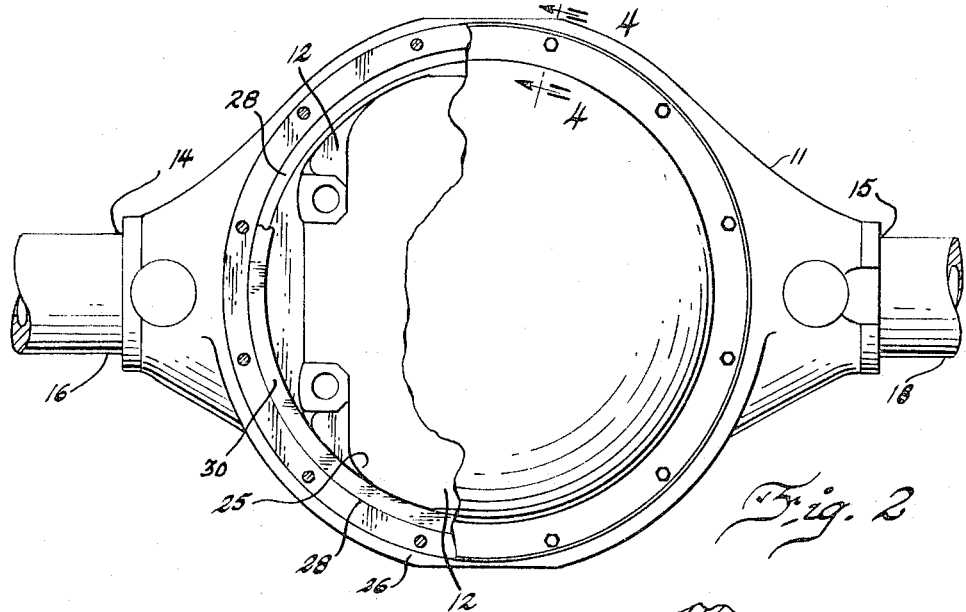
FIGURE 2 is an enlarged fragmentary end view of the axle housing assembly with the cover partially removed.

Referring to FIGURES 1 and 2, 11 indicates generally a vehicle differential gear housing. The housing 11 has a chamber 12 therein. A pair of generally opposed entrances 14 and 15 provide communication with the chamber. Positioned in entrance 14 is axle tube 16 which is secured therein by welding in perforations 19. Axle tube 18 is similarly located in entrance 15.

Axle tubes 16 and 18 have integral flanges 20 and 21 respectively located thereon remote from housing 11. Flanges 20 and 21 have holes therein for the securing thereto by bolts or the like, brake support plates for conventional shoe type brakes.

Figure 3:
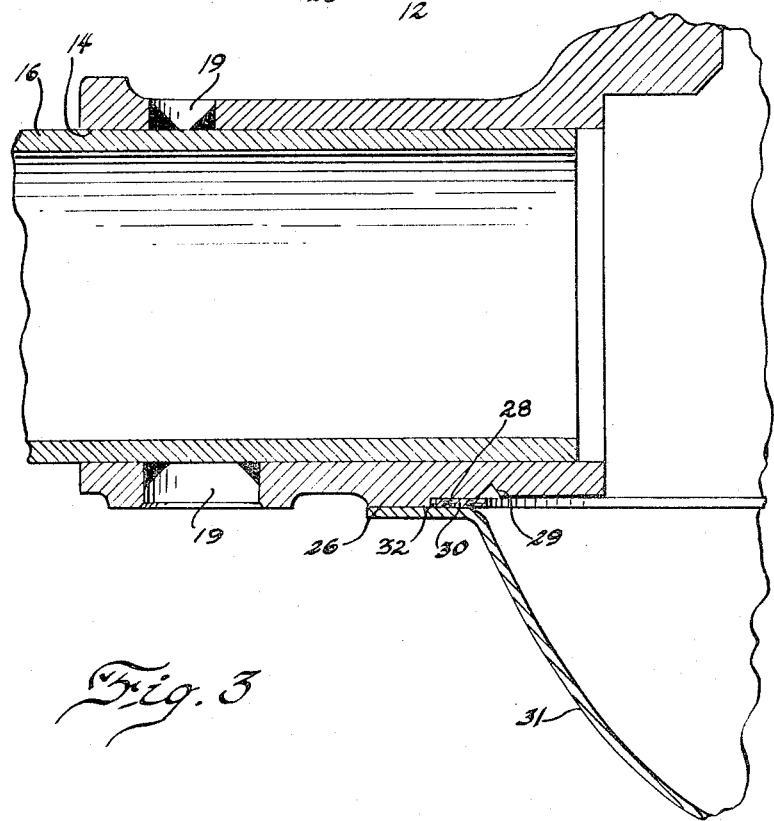
FIGURE 3 is an enlarged fragmentary top section of the axle housing assembly with an axle tube, the cover and gasket in position.

Housing 11 has an aperture 24 providing communication between chamber 12 and the housing exterior. Generally opposed to aperture 24 is large opening 25 which also communicates with the housing exterior. Opening 25 is surrounded by a flanged mounting surface 26 which is preferably circular in character except for upper and lower flats for road clearance. Also circular in character to simplify machining same is gasket seat 28 which is recessed in housing 11 toward chamber 12 (see FIGURE 4). Chamfer 29 (FIGURE 3) eliminates burrs resulting from the seat machining operation and the mounting surface facing operation.

Lathe cut precompression gasket 30 is mounted in seat 28. Gasket 30 may be attached in seat 28 with adhesive material to insure proper location during assembly. Cover 31 at surface 32 is secured with metal-to-metal contact to mounting surface 26 by cap screws 33 and lock washers 34. Surface 32 also contacts and compresses gasket 30 against seat 28.

In the embodiment disclosed in FIGURE 5, the gasket seat 35 and gasket are located in the cover 36. Again there is metal-to-metal contact between the cover and the mounting surface radially outward of opening 25.

FIGURE 6 illustrates in schematic fashion the driving and braking components of a vehicle which affect the axle housing assembly. The driving force of the engine is transmitted to the propeller shaft 38 via a universal joint 39 connected to the splined end of pinion shaft 40. Pinion shaft 40 extends through aperture 24 into chamber 12. The pinion portion 41 of the pinion shaft engages ring gear 42 secured to differential case 44 that is rotatably supported in housing chamber 12. Case 44 has upper and lower differential pinion gears 45 and 46 engaging differential side gears 48 and 49 respectively which, in turn, drive axle tube supported axles 50 and 51. Wheel hubs (not shown) attached to axles 50 and 51 respectively drive the vehicle via wheels 55 and 56.

During vehicle operation and particularly during acceleration, the differential gear housing portion 11 of the axle housing assembly is subjected to a rotating load where the differential gear case 44 is rotatably mounted by roller bearings 58 and 59 in the chamber 12 opposite the chamber opening 25. The cover by closing the opening adds structural rigidity in the area where the bearing caps connect roller bearings 58 and 59 to the axle housing assembly.

Bolted to flanges 20 and 21 are brake support plates 60 and 61 respectively. Conventional brake shoes 62 and 64 are adapted to engage brake drums 65 and 66 associated with wheels 55 and 56 to stop same and ultimately the vehicle. The brake shoes transmit the force needed to stop the vehicle to anchor blocks (not shown) located on the brake support plates. Since the twisting action is transmitted to the attached axle tubes by the anchor blocks which are located radially outward of the axle tube flanges on the connected brake support plates, it is readily apparent that a large moment is applied to the axle housing assembly. Clearly the cover can effectively aid in providing added rigidity at the unsupported housing opening.

From the foregoing, it is apparent that an overall reduction in axle housing assembly structure can be effected. Further, the sealing of the opening 25 is simplified to the extent that the particularly economical arrangement described can be utilized.

Having thus described the invention, it will be realized that the drawings merely show the preferred embodiments thereof and that various changes in size, shapes or arrangement of parts may be employed without departing from the spirit of the invention or the scope of the subjoined claims.

I claim:
1. An axle housing assembly comprising:
 (a) a differential gear unit housing, said housing defining a chamber, said chamber having a pair of generally opposed entrances in each of which is integrally secured an axle tube, each of said axle tubes being adapted for the insertion therethrough of an axle shaft, said chamber having an aperture therein for the extension therethrough of the shaft of a pinion, said chamber also having an opening therein, said housing being adapted for the rotatable positioning in said chamber of the pinion and the associated axle drive differential gear unit installable through said opening, said housing having a circular mounting surface surrounding said opening, said housing having a peripheral, circular gasket seat surrounding said opening and surrounded by said mounting surface, said gasket seat being recessed inward toward said chamber from said mounting surface and substantially parallel thereto, said seat being the outermost housing surface between said opening and said mounting surface;
 (b) a lathe cut precompression type gasket of generally rectangular cross section located in said gasket seat and projecting therefrom;
 (c) and a generally circular cover fixedly mounted on said mounting surface and closing said opening, the surface of said cover in contact with said mounting surface also contacting and compressing said gasket against said seat to seal said opening to prevent the passage of grease therethrough.

2. An axle housing assembly comprising:
 (a) a differential gear unit housing, said housing defining a chamber, said chamber having a pair of generally opposed entrances in each of which is integrally secured an axle tube, each of said axle tubes being adapted for the insertion therethrough of an axle shaft, said chamber having an aperture therein for the extension therethrough of the shaft of a pinion, said chamber also having an opening therein, said housing being adapted for the rotatable positioning in said chamber of the pinion and the associated axle drive differential gear unit installable through said opening, said housing having a circular mounting surface surrounding said opening;
 (b) a cover fixedly mounted on said mounting surface and closing said opening, the cover surface contacting said mounting surface also having a peripheral circular gasket seat recessed therefrom of said chamber and substantially parallel thereto, said seat surrounding said opening and being surrounded by said mounting surface, said seat being the outermost surface of said cover between said opening and said cover surface;
 (c) and a lathe cut precompression type gasket having a generally rectangular cross section located in said gasket seat and projecting therefrom, said gasket being compressed between said gasket seat and said housing thereby sealing said opening when said cover is mounted on said mounting surface.

References Cited by the Examiner

UNITED STATES PATENTS

| | | | |
|---|---|---|---|
| 1,291,009 | 1/1919 | Johnson | 74—607 |
| 1,374,603 | 4/1921 | Patten | 74—710.5 |
| 3,007,600 | 11/1961 | Horner | 277—187 |

FOREIGN PATENTS

| | | |
|---|---|---|
| 229,826 | 8/1960 | Australia. |
| 226,717 | 1/1925 | Great Britain. |

OTHER REFERENCES

Dodge Shop Manual D–13001, 2nd ed., 1950, Sec. II, p. 9.

FRED C. MATTERN, JR., *Primary Examiner.*

W. S. RATLIFF, *Assistant Examiner.*